United States Patent [19]

Tran et al.

[11] Patent Number: 5,702,164
[45] Date of Patent: Dec. 30, 1997

[54] TRACTION CONTROL THROUGH CROSS-AXES OSCILLATION CONTROL

[75] Inventors: Minh N. Tran; Davorin D. Hrovat, both of Dearborn, Mich.

[73] Assignee: Ford Global Technologies, Inc., Dearborn, Mich.

[21] Appl. No.: 610,199

[22] Filed: Mar. 5, 1996

[51] Int. Cl.$^6$ .................................................. B60T 8/58
[52] U.S. Cl. ............................................. 303/139; 303/141
[58] Field of Search ................................. 303/139, 140, 303/141, 148, 149, 169

[56] References Cited

U.S. PATENT DOCUMENTS

| | | | |
|---|---|---|---|
| 4,926,333 | 5/1990 | Hashiguchi et al. | 303/139 |
| 4,947,332 | 8/1990 | Ghoneim | 303/141 |
| 4,964,045 | 10/1990 | Iwata et al. | 303/139 |

*Primary Examiner*—Matthew C. Graham
*Attorney, Agent, or Firm*—Peter Abolins

[57] ABSTRACT

This invention uses cross-axis oscillation control of braking for traction control systems. Changing the amount of braking on each side of the vehicle reduces total wheel slip in a well-controlled, smooth and highly effective manner.

1 Claim, 3 Drawing Sheets

TRACTION CONTROL THROUGH CROSS-AXES OSCILLATION CONTROL

BACKGROUND OF THE INVENTION

1. Field of the Invention

This invention relates to electronic control of the driving wheels of a vehicle having an internal combustion engine.

2. Prior Art

Traction control of various types is known. For example, it is known to reduce the power applied to the driving wheels through various combinations of controlling engine operating parameters such as spark advance, fuel injection, and throttle control. Braking may also be used to control driving wheel rotation.

Even though such control of the driving wheels is known, there still is a need to improve the performance of traction control in various operating environments. Conditions such as low and medium speed operations on combined, split ice/snow surfaces are addressed, in part, by this invention.

SUMMARY OF THE INVENTION

An embodiment of this invention includes an algorithm for effective cross-axes oscillation control for traction control systems and strategies not based on brake pressure. The axis is defined to be the vehicle's longitudinal axis so that the amount of braking on the left and right side of the vehicle is varied. The speed of each half shaft is controlled by braking of the associated wheel. An alternative way of defining cross-axes oscillation control is that the oscillations are across the two driving-wheel axes or halfshafts assuming a front wheel drive or a rear wheel drive vehicle.

Advantageously, there is elimination or substantial reduction of cross-axes oscillation during traction control. When compared with conventional traction control systems in production, the proposed algorithm substantially reduces drive line torque loads and brake power dissipation and improves traction control performance especially on split-mu surfaces such as ice and snow.

DETAILED DESCRIPTION OF THE INVENTION

Figure 1:
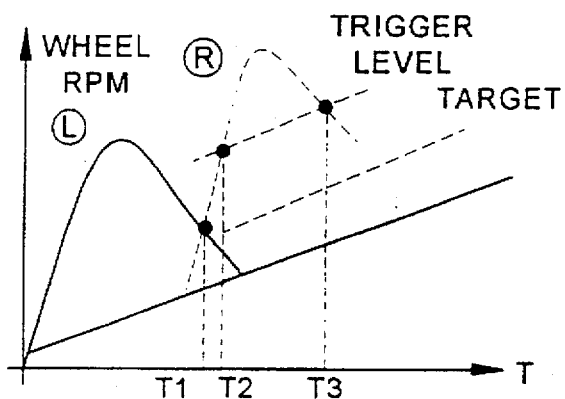
FIG. 1 is a rpm versus time graphic representation of cross-axes spin time sequence on split surfaces in accordance with an embodiment of this invention.
Figure 3A:
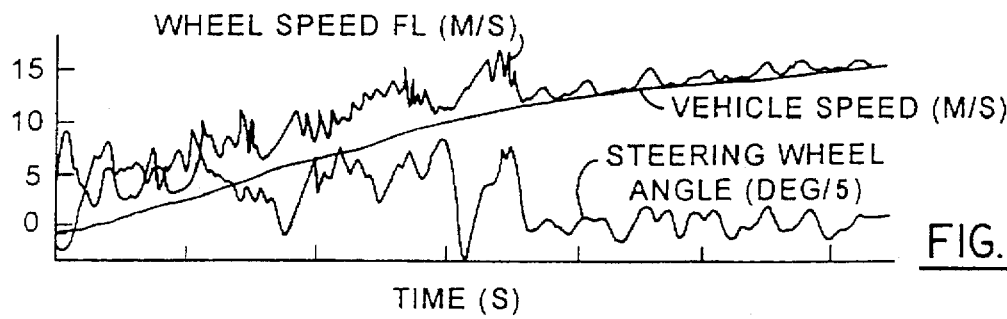
FIG. 3A, 3B and 3C are graphic representations of straight line acceleration on ice/snow split using the prior art.
Figure 3B:
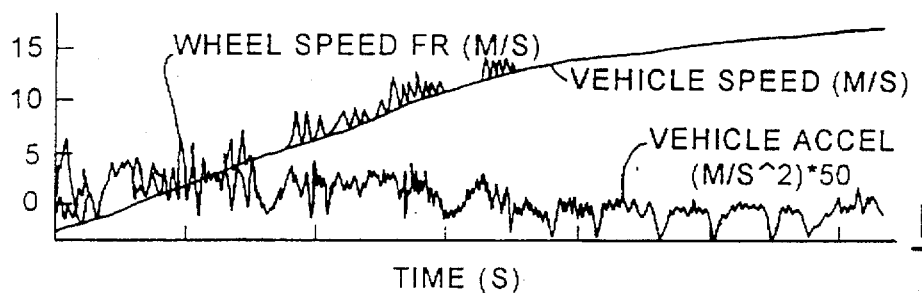
Figure 3C:
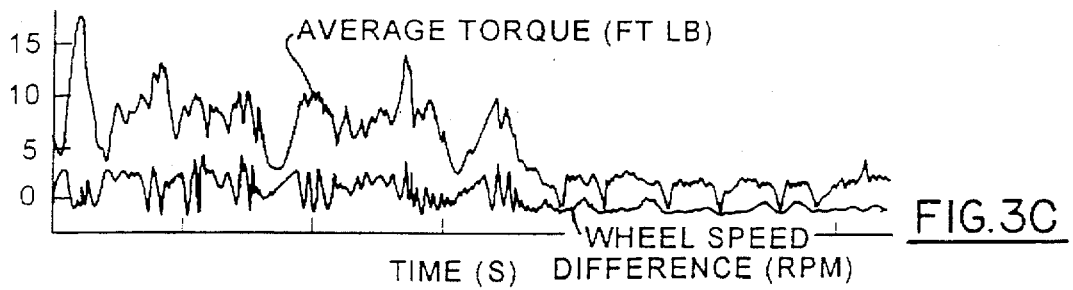

For operations on split-mu surfaces where the two mu's are relatively close (e.g. ice/snow) it is proposed to use the following scheme described with the help of FIG. 1. Assume that at the beginning the left wheel is on ice and the right on snow. Aggressive gas pedal tip-in then leads to the spin of the left wheel as shown in FIG. 1. This large spin in turn triggers the brake application on the left wheel, which in turn may cause the right wheel to spin as well. This "cross-axes" spin is detected at time $t_1$, which presets the stage for the proposed controls.

The actual control starts at time $t_2$, when the right wheel spin is above the left and the right wheel slip rpm is crossing the trigger level (which is typically 100–150 rpm above the target slip). At time $t_2$, the left wheel brake pressure is vented and the brake pressure on the right wheel starts to rise to prevent excessive spin of this wheel.

Finally, the "normal" closed-loop control of both wheel slips resumes after time $t_3$, where both the engine as well as brake control may be used.

It is important to stress that the application of right wheel brake control in the preferred embodiment of FIG. 1, is limited to a pulse from time $t_2$ to time $t_{2A}$, ($t_2 < t_{2A} \leq t_3$) where $t_{2A}$ is a calibratable parameter.

Comparing the prior art FIGS. 3A, 3B, 3C and FIGS. 4A, 4B and 4C in accordance with an embodiment of this invention, the latter leads to the following benefits on ice/snow split-mu: up to 50% lower maximum driveline torques; up to four times lower driveline power; 10% faster 150 ft. times; 26% faster 0–35 mph. times; and substantially smoother (less NVH) driver with much less required steering correction.

Figure 2:
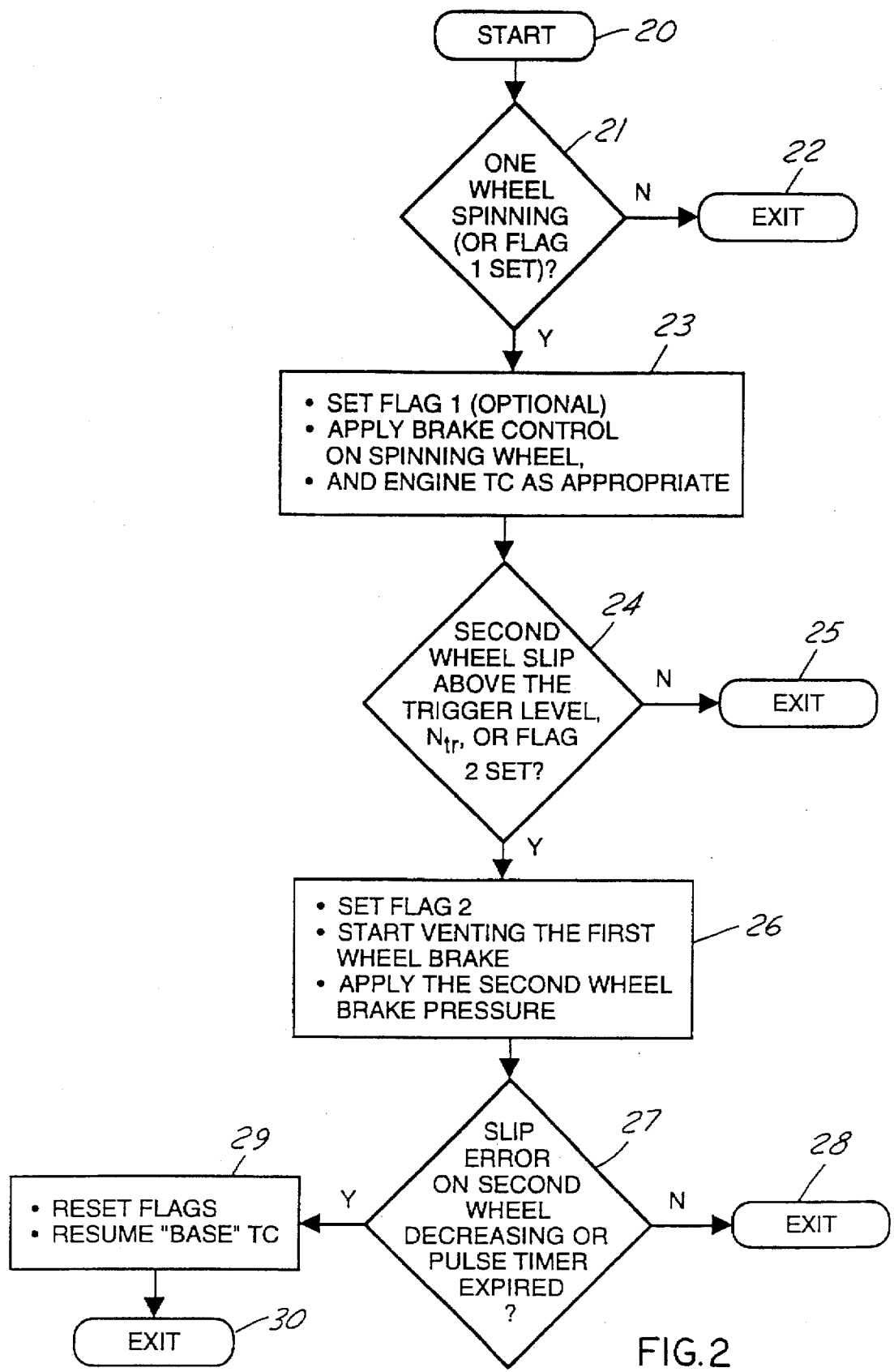
FIG. 2 is a logic flow diagram in accordance with an embodiment of this invention.
Figure 4A:
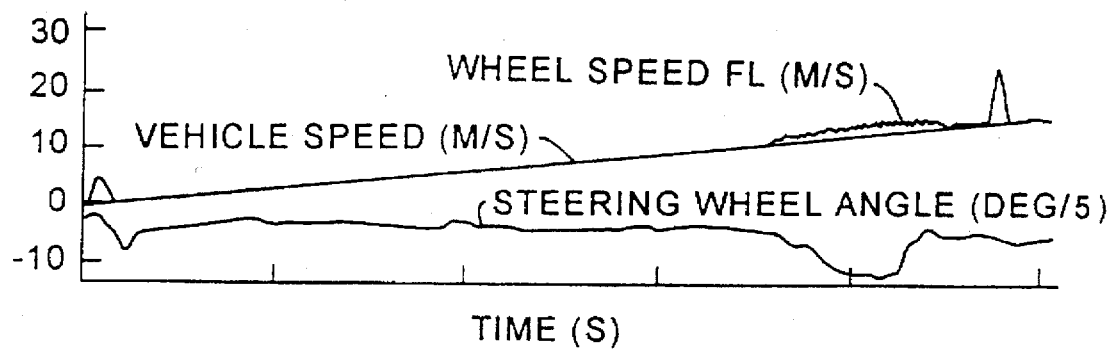
FIGS. 4A, 4B and 4C are graphic representations of straight line acceleration on ice/snow split in accordance with an embodiment of this invention.
Figure 4B:
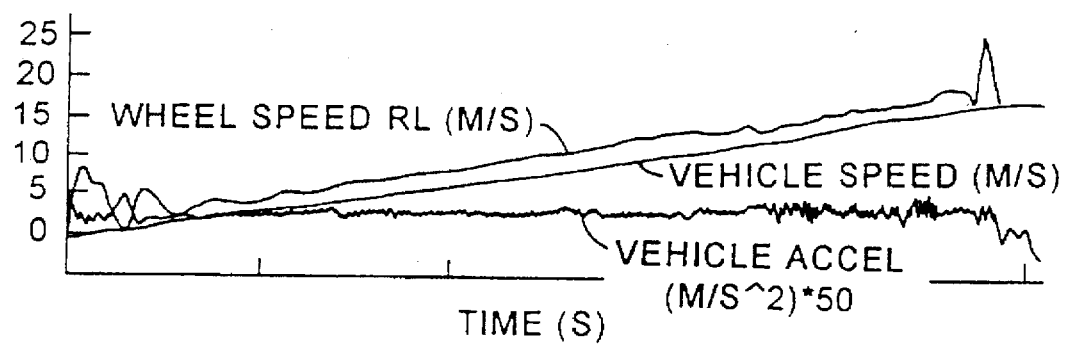
Figure 4C:
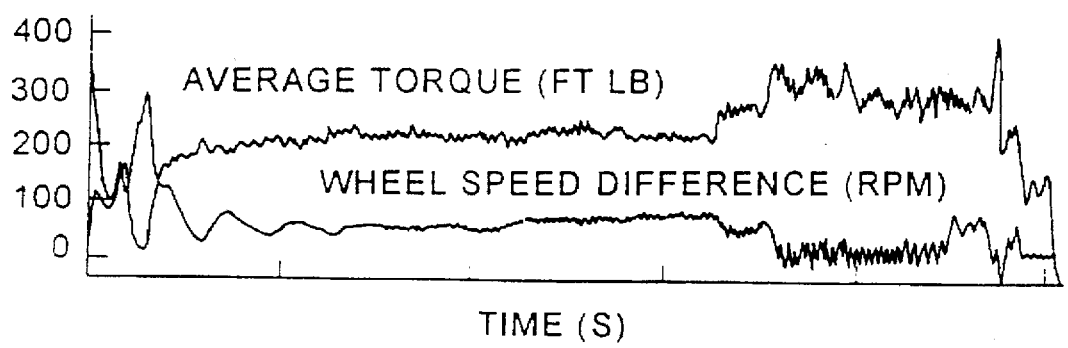

Referring to FIG. 2, logic flow starts at a block 20 and goes to a decision block 21 wherein it is asked if one wheel is spinning or if the corresponding flag is set. If the answer is no, logic flow goes to a block 22 which exits logic flow. If the answer at block 21 is yes, logic flow goes to a block 23 wherein a one-wheel spin flag is set, braking control is applied to the spinning wheel and the engine traction control is applied as appropriate. Logic flow then goes to a decision block 24 wherein a second (other) wheel slip above the trigger level is checked, as well as the check is made if a flag 2 (the other wheel spin flag) is set. If the answer is no, logic flow exits at a block 25. If the answer is yes at block 24 logic flow goes to a block 26 wherein the flag 2 is set, the venting of the first wheel brake is initialized, and the second wheel brake pressure is applied. Such application is for a predetermined pulse duration which should be completed by the time of the subsequent crossing of the trigger level by the second wheel. Logic flow then goes to a decision block 27 wherein it is investigated if the slip error on the second wheel is decreasing or if the corresponding brake pulse timer expired. If the answer is no, logic flow goes to an exit block 28. If the answer is yes, logic flow goes to a block 29 wherein the flags are reset and the base traction control is resumed. Logic flow goes to an exit block 30 from block 29.

Various modifications and variations will no doubt occur to those skilled in the various arts to which this invention pertains. Such variations which basically rely on the teachings through which this disclosure has advanced the art are properly considered within the scope of this invention.

We claim:

1. A traction control system for a vehicle having an engine, brakes and a powertrain, said system providing additional traction by providing control of the brakes by alternately braking the driving wheels a different amount in a manner so as to reduce the total amount of wheel slip, comprising the steps of:

determining if a first driving wheel is spinning;

increasing braking of said first driving wheel;

determining if a second driving wheel is spinning above a predetermined amount;

if yes, increasing braking of said second driving wheel for a predetermined pulse duration and completely reducing braking of said first driving wheel;

setting a predetermined second wheel slip trigger level;

setting a first flag if one wheel is spinning;

setting a second flag if the second wheel slip is above the trigger level;

determining if a slip error in the second wheel, expressed as a difference between the second wheel speed and a reference wheel speed, is decreasing below a predetermined level or if the predetermined pulse duration for increased braking of the second driving wheel has expired; and resetting said first and second flags.

* * * * *